US011396105B2

(12) United States Patent
Simkins et al.

(10) Patent No.: US 11,396,105 B2
(45) Date of Patent: *Jul. 26, 2022

(54) SENSOR MODULE FOR A ROBOT

(71) Applicant: ABB Schweiz AG, Baden (CH)

(72) Inventors: Matt Simkins, Redwood City, CA (US); Said Zahrai, Seefeld (DE)

(73) Assignee: ABB Schweiz AG, Baden (CH)

( * ) Notice: Subject to any disclaimer, the term of this patent is extended or adjusted under 35 U.S.C. 154(b) by 625 days.

This patent is subject to a terminal disclaimer.

(21) Appl. No.: 16/281,747

(22) Filed: Feb. 21, 2019

(65) Prior Publication Data

US 2020/0269447 A1 Aug. 27, 2020

Related U.S. Application Data

(63) Continuation of application No. 16/281,726, filed on Feb. 21, 2019, and a continuation of application No. 16/281,767, filed on Feb. 21, 2019.

(51) Int. Cl.
| | |
|---|---|
| *G05B 19/04* | (2006.01) |
| *G05B 19/18* | (2006.01) |
| *B25J 19/02* | (2006.01) |
| *B25J 17/02* | (2006.01) |
| *B25J 9/16* | (2006.01) |
| *B25J 13/06* | (2006.01) |
| *B25J 13/08* | (2006.01) |
| *B25J 15/00* | (2006.01) |

(Continued)

(52) U.S. Cl.
CPC ............. *B25J 19/02* (2013.01); *B25J 9/1694* (2013.01); *B25J 13/06* (2013.01); *B25J 13/08* (2013.01); *B25J 15/0019* (2013.01); *B25J 17/02* (2013.01); *B25J 18/00* (2013.01); *B25J 19/0054* (2013.01); *B25J 19/021* (2013.01); *B25J 19/026* (2013.01)

(58) Field of Classification Search
CPC . G05B 2219/34012; B25J 13/06; B25J 13/08; B25J 15/0019; B25J 15/04; B25J 17/02; B25J 18/00; B25J 19/0033; B25J 19/0054; B25J 19/02; B25J 19/021; B25J 19/026; B25J 9/161; B25J 9/1694
See application file for complete search history.

(56) References Cited

U.S. PATENT DOCUMENTS

| | | |
|---|---|---|
| 4,600,355 A | 7/1986 | Johnson |
| 4,829,840 A | 5/1989 | Torii et al. |

(Continued)

OTHER PUBLICATIONS

Patent Cooperation Treaty, International Search Report and Written Opinion issued in corresponding PCT application No. PCT/US2020/018599, dated Apr. 27, 2020, 9pp.

(Continued)

*Primary Examiner* — Harry Y Oh
(74) *Attorney, Agent, or Firm* — Leydig, Voit & Mayer, Ltd.

(57) ABSTRACT

A sensor module is provided for adding functionality to a robot. The sensor module is attached between the robot tool flange and the end effector. Additional interchangeable modules may also be provided between the tool flange and the end effector. The sensor module includes a sensor for monitoring a condition near the end effector. An output port of the module transmits sensor data to a processor outside of the sensor module for further processing.

19 Claims, 10 Drawing Sheets

(51) Int. Cl.
B25J 18/00 (2006.01)
B25J 19/00 (2006.01)

(56) References Cited

U.S. PATENT DOCUMENTS

| | | | |
|---|---|---|---|
| 6,502,657 B2* | 1/2003 | Kerrebrock | B25J 9/08 |
| | | | 180/218 |
| 9,597,796 B2* | 3/2017 | Rollinson | B25J 9/08 |
| 9,604,357 B2 | 3/2017 | Kapoor et al. | |
| 9,770,825 B2 | 9/2017 | Goldenberg et al. | |
| 9,785,187 B2 | 10/2017 | Kim et al. | |
| 9,792,504 B2 | 10/2017 | Lin et al. | |
| 2003/0177656 A1 | 9/2003 | Sawdon | |
| 2003/0180135 A1 | 9/2003 | Sawdon et al. | |
| 2005/0124013 A1* | 6/2005 | Bonen | G01N 33/5302 |
| | | | 435/7.32 |
| 2010/0224021 A1* | 9/2010 | Long | B25J 9/108 |
| | | | 74/490.01 |
| 2012/0286533 A1 | 11/2012 | Mettler et al. | |
| 2013/0331986 A1 | 12/2013 | Tait et al. | |
| 2013/0340560 A1* | 12/2013 | Burridge | B25J 17/025 |
| | | | 74/490.05 |
| 2014/0276950 A1* | 9/2014 | Smaby | A61B 34/37 |
| | | | 606/130 |
| 2016/0067868 A1 | 3/2016 | Porter et al. | |
| 2016/0114491 A1 | 4/2016 | Lee et al. | |
| 2016/0305842 A1 | 10/2016 | Vulcano | |
| 2018/0169868 A1 | 6/2018 | Jackowski et al. | |
| 2018/0257221 A1 | 9/2018 | Toothaker et al. | |
| 2021/0178575 A1* | 6/2021 | Riek | B25J 9/08 |

OTHER PUBLICATIONS

Patent Cooperation Treaty, International Search Report and Written Opinion issued in corresponding PCT application No. PCT/US2020/018603, dated Apr. 24, 2020, 10pp.
Patent Cooperation Treaty, International Search Report and Written Opinion issued in corresponding PCT application No. PCT/US2020/018607, dated May 7, 2020, 9pp.
International Standard; Manipulating industrial robots—Mechanical interfaces; ISO 9409-1; Third edition; Mar. 1, 2004; 10 pgs.; Switzerland.
Yim et al.; Modular Self-Reconfigurable Robot Systems; IEEE Robotics & Automation Magazine; 2007; 10 pgs.
Yu et al.; Self-adapting modular robotics: A generalized distributed consensus framework. In Robotics and Automation, 2009. ICRA '09. IEEE International Conference on, May 12-17, 2009, Kobe, Japan, 1881-1888. 9 pgs. Piscataway, N.J.

* cited by examiner

SENSOR MODULE FOR A ROBOT

CROSS-REFERENCE TO PRIOR APPLICATIONS

This application is a continuation of U.S. application Ser. No. 16/281,726, filed on Feb. 21, 2019, and a continuation of U.S. application Ser. No. 16/281,767, filed on Feb. 21, 2019. Priority is claimed to both of the foregoing applications, the entire disclosures of which are hereby incorporated by reference herein.

BACKGROUND

The present inventions relate generally to robots, and more particularly, to a processing module located between the tool mounting surface of the robot and the end effector thereof.

Robots typically include a series of joints that allow an end effector to be moved from place to place to perform a variety of tasks. Often, one or more sensors are placed on or near the end effector to monitor the surroundings around the end effector in order to enable the end effector to perform various tasks. Robots also include a robot controller that collects data from and sends instructions to the joints, end effector and sensors. Typically, the robot controller may be located in or near the base of the robot or in a separate computer located a short distance from the robot, although it is also possible for the robot controller to be located remotely with communication between the robot and the controller occurring over a wide area network.

However, the location of the robot controller can result in decreased robotic performance in some situations. For example, where it is desired for the robot to perform real time operations, communication delays between sensors at the end effector and the robot controller can decrease performance of the robot. Sensors that transmit large amounts of data can also limit performance of a robot. For example, cameras transmitting video data require high-bandwidth transmission. Communication speed and bandwidth requirements between sensors and the robot controller can result in latency and jitter problems that degrade overall performance of the robot. Such problems can be further exacerbated as a greater number of sensors are added to the robot to provide additional functionality.

In addition to communication limitations, conventional arrangements for the robot controller and sensors can raise security and reliability risks. For example, as sensors become more and more sophisticated, it is common for such sensors to require additional software applications and drivers provided by third-party developers. However, loading this type of additional software onto the robot controller can present unexpected and uncontrolled risks that may be unacceptable.

Another problem with the increased number of sensors being used with robots is the difficulty in placing such sensors in a suitable and convenient location. Typically, the user of a robot may begin with an off-the-shelf end effector attached to the tool flange of the robot. As the user desires to add additional functionality to the robot, it may be necessary to add additional sensors to the robot. Typically, it is desirable to mount sensors close to the end effector since the operations of the robot are performed by the end effector. However, it can be difficult to find a location to mount the sensor at the end effector without interfering with the end effector or the surrounding environment. It can also be challenging and/or time-consuming to properly mount a sensor in a secure manner.

Still another problem with the number of sensors that may be used on a robot is the associated communication paths to the robot controller. Where cables are used to connect sensors to the robot controller, it is typical for each sensor to be connected to the robot controller with an individual cable. Thus, when multiple sensors are used at the end effector, an equivalent number of cables must be run to the robot controller. This can create routing difficulties and increase complexity of the system. Alternatively, where data is transmitted wirelessly from sensors to the robot controller, each sensor requires a separate signal pathway which can congest available bandwidth.

In view of the various needs for improvements in robot performance, it would be desirable to provide interchangeable modules between the robot tool flange and the end effector.

SUMMARY

Interchangeable modules are described that may be attached between the tool flange of a robot and the end effector. The modules include a processing module, a sensor module and a communications module. The modules can be attached to the robot tool flange in a stack with the end effector being attached to the end of the stack. The modules allow additional functionality to be easily added to a robot with minimal modifications to the robot or end effector.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
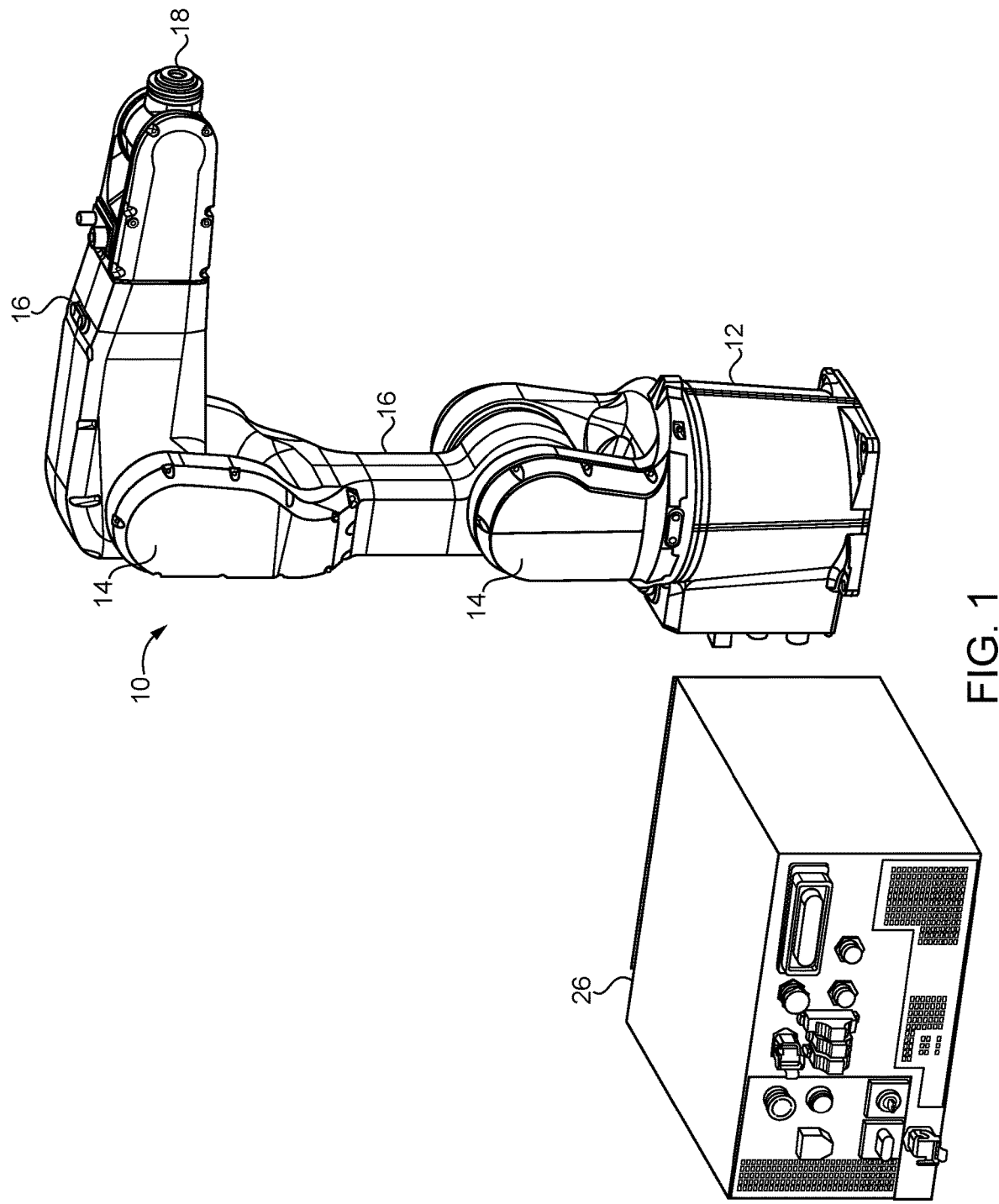
FIG. 1 is a perspective view of a robot.

Referring now to the figures, and particularly FIG. 1, an example of a robot 10 is shown. As shown, the robot 10 has a base 12 that may be either fixed in place or movable. The robot 10 is provided with one or more joints 14 that allow the members 16 (e.g., arms 16) of the robot 10 to be moved in various directions. Although pivot joints 14 are illustrated in FIG. 1, it is also possible that the joints 14 may be linearly extendable joints, rotary joints, or other types of joints that allow movement between two members 16 of the robot 10. At an opposite end from the base 12, the robot 10 may be provided with a robot tool mounting surface 18, or tool flange 18. Preferably, the tool flange 18 (e.g., FIG. 4) is an industry standard tool flange 18 that allows end effectors 22 by various manufacturers to be attached to the tool flange 18. For example, the preferred industry-standard tool flange satisfies ISO 9409-1:2004(E). In particular, the tool flange 18 preferably has a plurality of threaded holes 20 in an equally spaced circular pattern.

Figure 2:
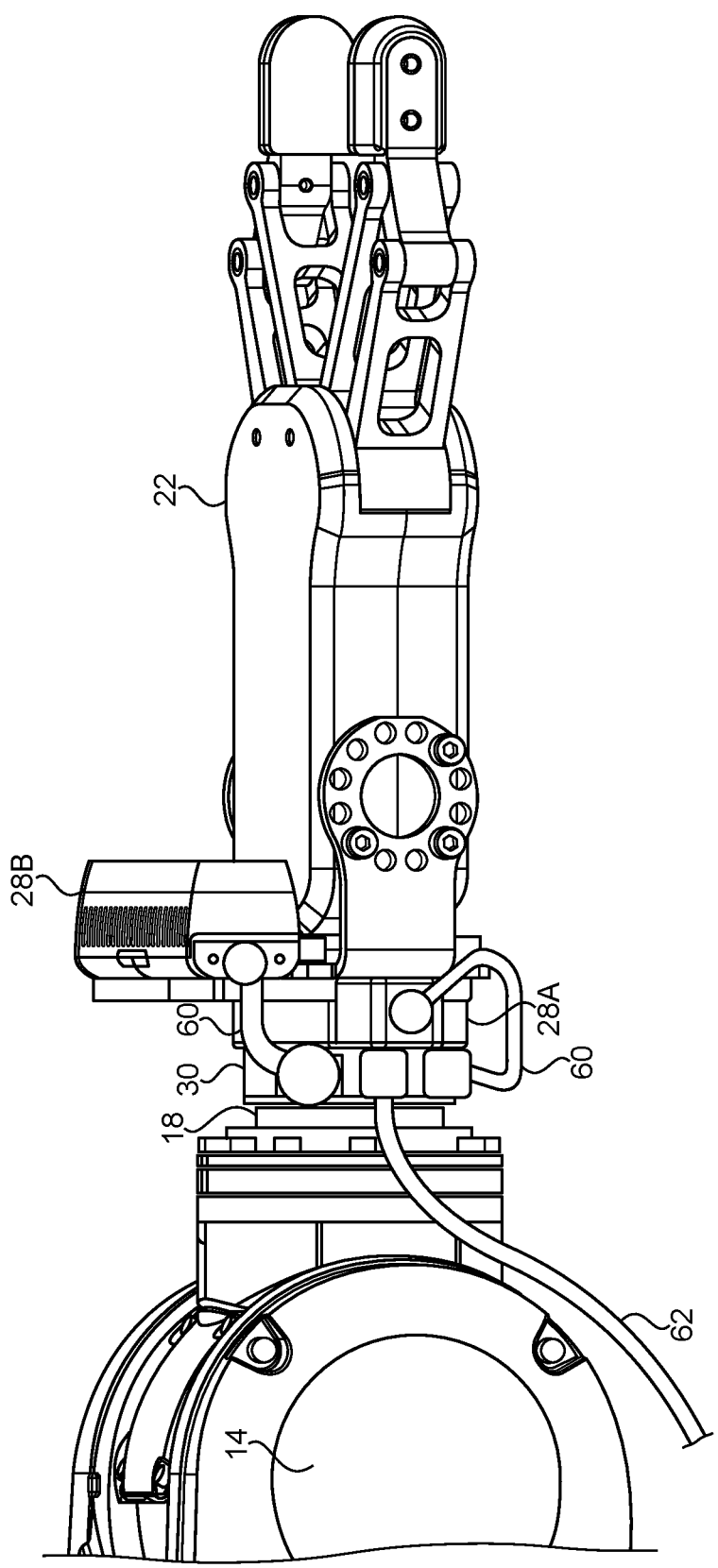
FIG. 2 is a side perspective view of an end effector attached to a robot tool flange.
Figure 3:
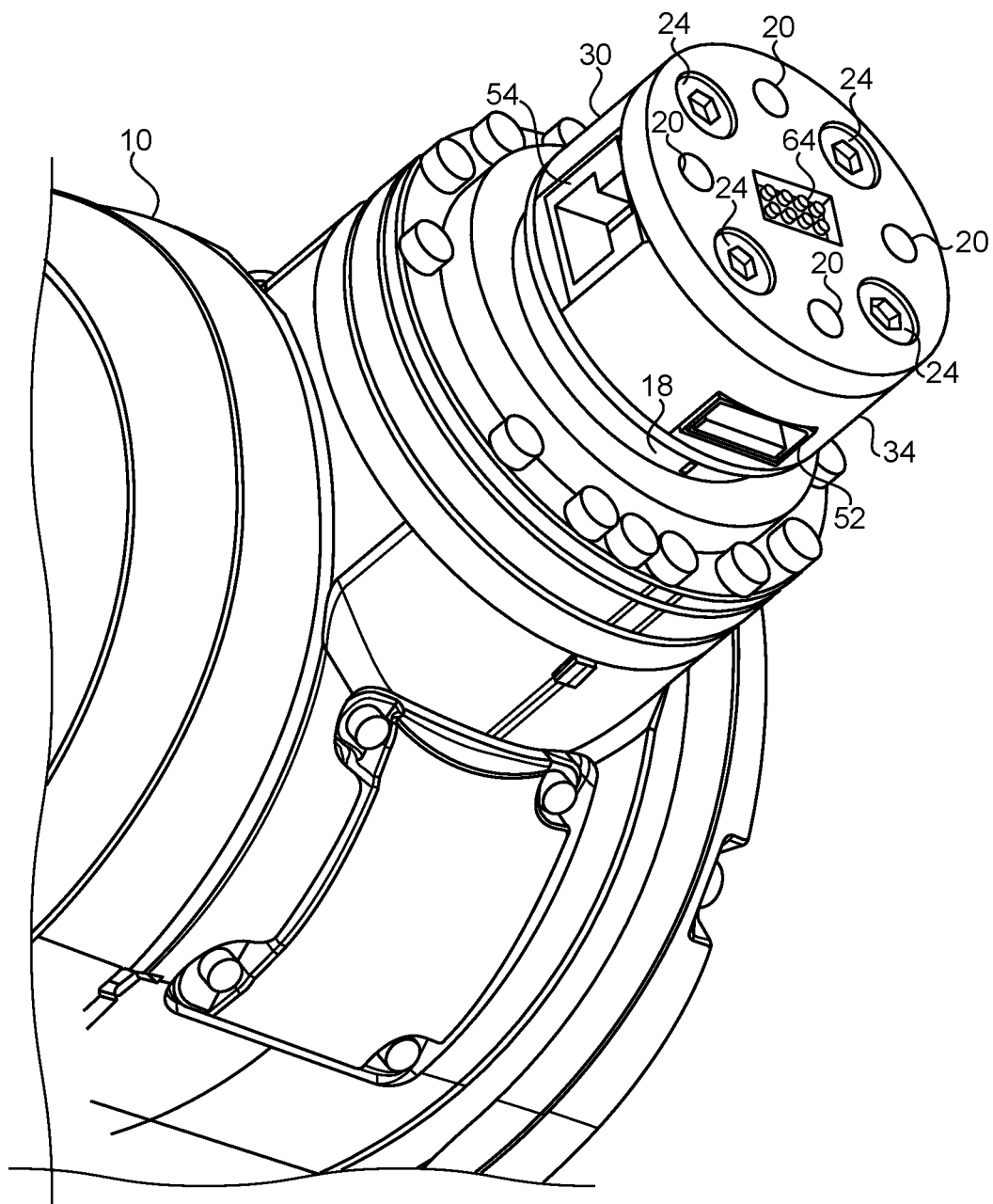
FIG. 3 is a perspective view of a processing module attached to a robot tool flange.

An example of an end effector 22 is shown in FIG. 2. A variety of end effectors 22 are known and may be used with the robot 10, such as grippers 22 (e.g., a two-jaw gripper 22, vacuum cup gripper, magnetic gripper), welders, etc. Conventionally, the end effector 22 is directly attached to the tool flange 18 with threaded bolts 24 that engage the threaded holes 20 of the tool flange 18. However, as shown in FIG. 2, the end effector 22 is attached to a module 30 described further below which is located between the tool flange 18 and the end effector 22. The joints 14 of the robot 10 between the base 12 and the end effector 22 allow the robot 10 to move the end effector 22 throughout the workspace surrounding the robot 10. In order to control movement of the robot joints 14, a robot controller 26 is provided with a processor that generates control signals which are transmitted to the joints 14 of the robot 10. As shown, the controller 26 may be located in a control box 26 located near the robot 10, but it is also possible for the controller 26 to be housed within the robot 10 itself (e.g., in the base 12), or for the controller 26 to be located remotely and communicate with the robot 10 over a network.

As shown in FIG. 2, the end effector 22 may be provided with multiple sensors 28 to monitor the surroundings around the end effector 22. Numerous types of sensors 28 may be used with the end effector 22 and include force load cells 28A, cameras 28B, accelerometers, thermometers, position sensors, etc. The sensors 28 may be located in various places including on the end effector 22 or in a sensor module 80 described below. However, it is preferable for the sensors 28 to be located distal from the tool flange 18 with respect to the base 12 so that the sensors 28 are near the end effector 22.

Figure 4:
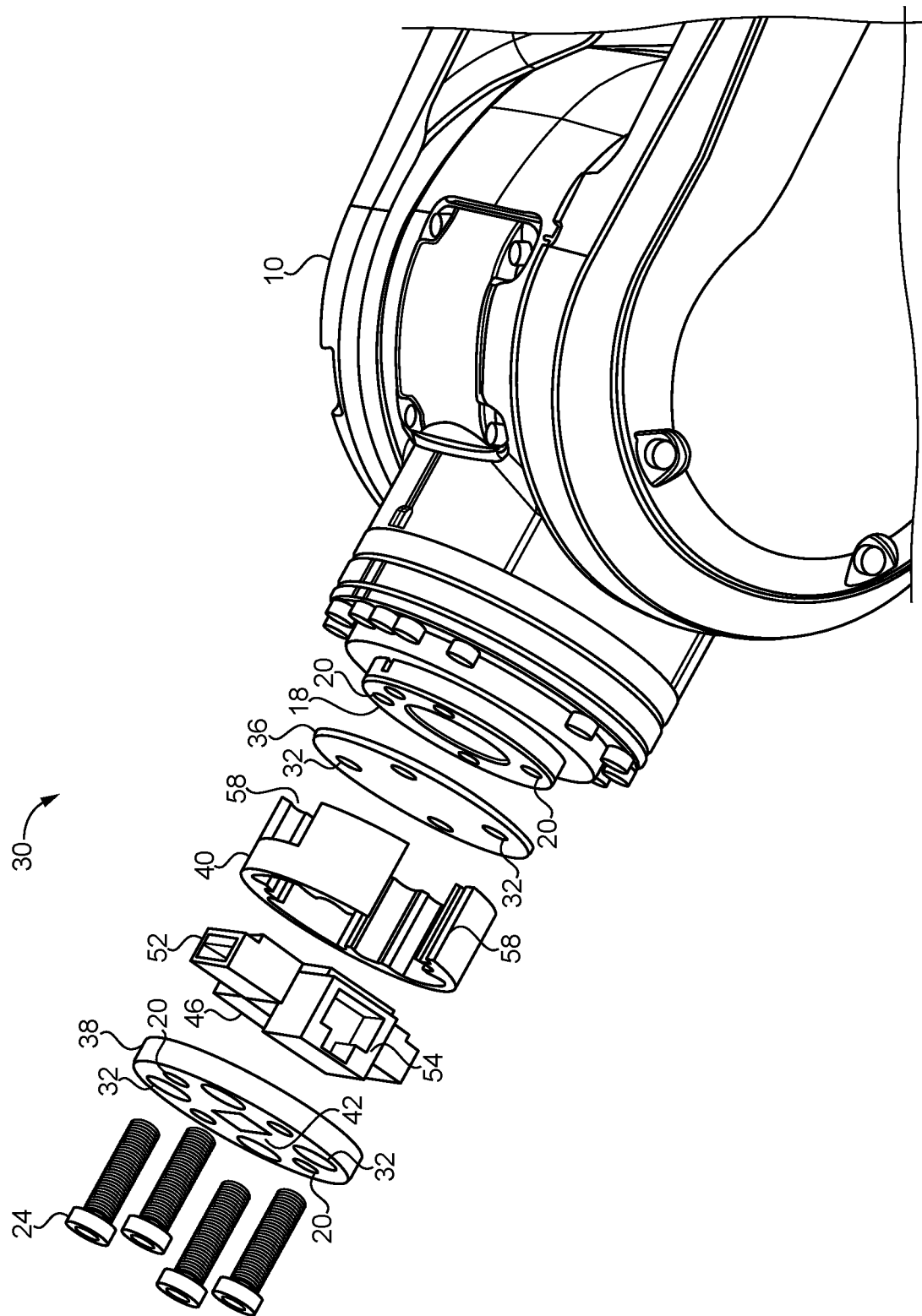
FIG. 4 is an exploded view of the processing module.

As shown in FIGS. 3-6, it may be desirable to provide the robot 10 with a processing module 30 located between the tool flange 18 and the end effector 22. If desired, the processing module 30 may be directly attached to the tool flange 18, and the end effector 22 may be directly attached to the processing module 30 as illustrated in FIG. 2. However, it is also possible to use modules 80, 100 (FIGS. 7 and 9) as described further below between the tool flange 18 and the end effector 22 in various combinations. Due to the similarities in the general construction and attachment of the various modules 30, 80, 100 described herein, it is not necessary to repeat every detail with respect to each module 30, 80, 100. As shown in FIG. 4, the modules 30, 80, 100 may be attached to the tool flange 18 with bolts 24 (i.e., threaded fasteners 24) that extend through holes 32 in the housing 34 and engage threaded holes 20 in the tool flange 18. As shown in FIG. 8, the modules 30, 80, 100 preferably also include a set of threaded holes 20 to allow other modules 30, 80, 100 to be attached to an adjacent module 30, 80, 100 in a like manner. Similarly, the end effector 22 may be attached to the most distal module 30, 80, 100 with bolts 24 engaging the threaded holes 20 of the most distal module 30, 80, 100.

As shown in FIG. 4, the housing 34 (labeled in FIG. 3) of the module 30, 80, 100 may include a first plate 36, a second plate 38 and a circumferential housing member 40. The housing 34 encloses one or more electrical circuits further described below. It may be desirable for the housing parts (e.g., first and second plates 36, 38 and circumferential member 40) to be secured to each other separate from the mounting bolts 24 (e.g., FIG. 8) with adhesive, snap connectors or small screws. The outer face surface of the first plate 36 is designed to be attached directly to the tool flange 18 of the robot 10, or in a like manner to a module mounting surface 42 of another module 30, 80, 100. On the other hand, the outer face surface 42, or mounting surface 42, of the second plate 38 is designed for the end effector 22 to be attached thereto, or in a like manner for the first plate 36 of another module 30, 80, 100 to be attached thereto. As shown in FIG. 4, it is also preferable for holes 32 to extend through the housing 34, including the first and second plates 36, 38, to allow bolts 24 to pass from the module mounting surface 42 to the tool flange 18 (or other module 30, 80, 100) on the opposite side of the module mounting surface 42. As also shown in FIG. 4 (and FIG. 8), it may be desirable for the threaded holes 20 in the module mounting surface 42 (for attaching the end effector 22 or other modules 30, 80, 100) to be angularly offset from the through holes 32. Preferably, the module mounting surface 42 of each module 30, 80, 100 is an industry standard tool flange 42. For example, the preferred industry standard tool flange 42 satisfies ISO 9409-1:2004(E). Preferably, as shown in the figures, the module mounting surface 42 of each module 30, 80, 100 as a plurality of threaded holes 20 in an equally spaced circular pattern. Even more preferably, the threaded holes 20 in the tool flange 18 and the module mounting surfaces 42 of the modules 30, 80, 100 have matching threads and hole patterns. Thus, each of the modules 30, 80, 100 may be interchangeably mounted between the robot tool flange 18 and the end effector 22. Multiple modules 30, 80, 100 may also be used between the robot tool flange 18 and the end effector 22 in various combinations as illustrated in FIG. 8. Thus, a conventional robot tool flange 18 and end effector 22 that are designed to be directly attached to each other (e.g., with threaded bolts 24 engaging the threaded holes 20 in the flange 18) may be adapted by interposing one or more modules 30, 80, 100 therebetween to add or improve functionality easily and simply.

Figure 5:
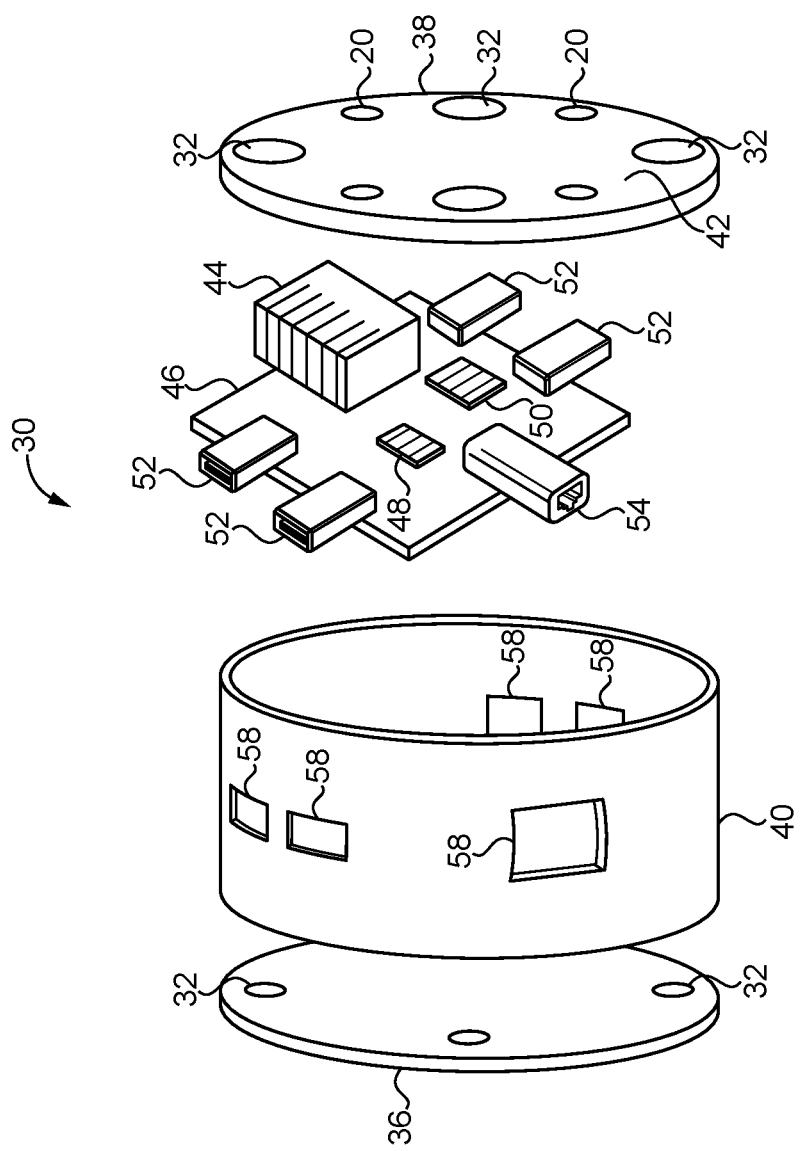
FIG. 5 is an exploded view of a processing module.

The processing module 30 shown in FIGS. 2-6 provides electrical circuitry within the housing 34 with a processor 44 for processing sensor data. As shown in FIG. 5, a circuit board 46 may be provided in the housing 34 with a processor 44, volatile memory 48, non-volatile memory 50, one or more input ports 52, and one or more output ports 54. An operating system and a program application may be stored on the non-volatile memory 50. Thus, the circuit board 46 may operate as a general-purpose computer with applications setup thereon specifically designed to process sensor data from the sensors 28 near to or on the end effector 22. That is, the operating system controls the basic functions of the processor 44, and the application provides instructions for the processor 44 to process data from one or more sensors 28. Although it is possible for the input and output ports 52, 54 to be wireless ports that are fully contained within the housing 34, openings 58 may alternatively be formed in the housing 34 in order to access the input ports 52 and the output port 54. It is understood that the input and output ports 52, 54 may take various forms; however, in one embodiment the input ports 52 are USB ports 52 and the output port 54 is an RJ-45 port 54. In use, a cable 60 may be connected between the sensors 28 and the input ports 52 to transfer sensor data to the processing module 30. The input ports 52 are connected to the processor 44 to transfer the sensor data thereto. The input ports 52 may also be connected to the processor 44 through the memory 48, 50, such that the sensor data is stored in the memory 48, 50 prior to being processed by the processor 44. When the processor 44 receives the sensor data, the processor 44 processes the sensor data into processed sensor data that is defined by fewer bits per second than the incoming sensor data. That is, while raw sensor data may be provided to the processor 44 through the input ports 52, the processed sensor data output from the processor 44 is condensed to provide less detailed data than the original incoming sensor data. For example, the processed sensor data may represent a summary of the raw sensor data, such as averages, totals, etc., or may be a flag or other indication of task completion or status. The output port 54 is connected to the processor 44 in order to transmit the processed sensor data out from the processing module 30. It is also possible for the processed sensor data to be stored in the memory 48, 50 such that the output port 54 is connected to the processor 44 through the memory 48, 50 to receive the processed sensor data. The output port 54 may be connected to the robot controller 26, and the processor therein, with an output cable 62 as shown in FIG. 2. Alternatively, the output cable 62 may be internal to the robot 10 and may use a face connector 64 like the pin or flush contact connector 64 shown in FIG. 3 between the first plate 36 of the module 30 and the tool flange 18. The output port 54 may also be a wireless port.

Figure 6:
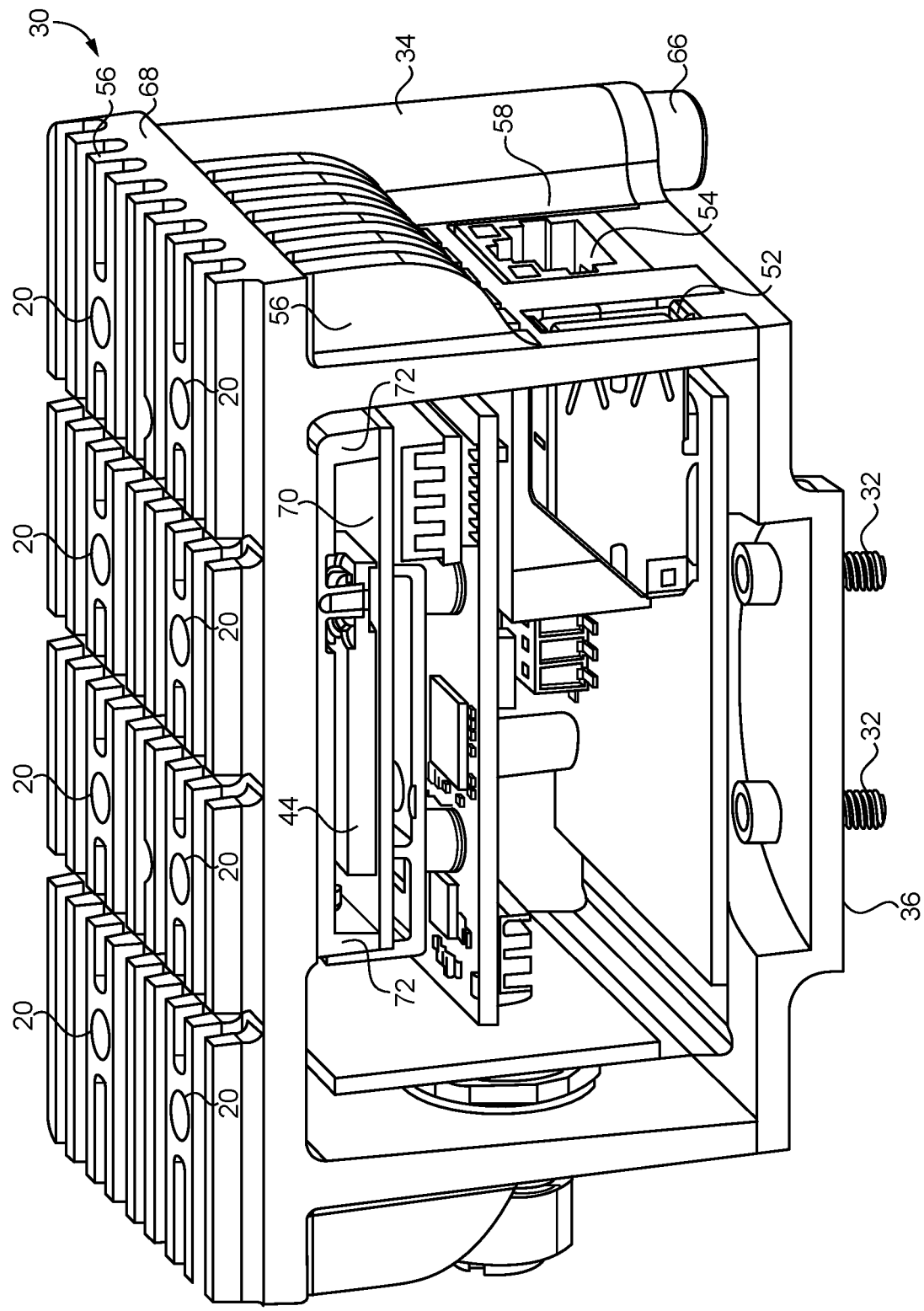
FIG. 6 is a cross-sectional view of another processing module.

Another example of the housing 34 is shown in FIG. 6. In this embodiment, the holes 32 for attaching the module 30, 80, 100 need not extend all the way through the housing 34, but instead, extend only through the first plate 36. A second set of bolts 66 is then used to attach an integral top portion 68 to the first plate 36. One advantage of this arrangement is that the threaded holes 20 of the module mounting surface 42 need not be angularly offset from the threaded holes 20 of an adjacent tool flange 18 or module 30, 80, 100. Additional space is also available within the housing 34 for electronics. However, it does require the module 30, 80, 100 to be assembled onto the tool flange 18 (or module 30, 80, 100) in multiple steps instead of a single step where the housing 34 is already completely secured together (e.g., FIG. 8). Also shown in FIG. 6 are exterior cooling fins 56 to provide cooling for the processor 44 and other electrical components within the housing 34. Preferably, the housing 34 is made of metal with the cooling fins 56 being integrally formed thereon. The processor 44 may be attached to a heat sink 70, and the housing 34 may be provided with a metal mounting interface 72 for the heat sink 70, such that the processor 44 is in thermal communication with the cooling fins 56 to cool the processor 44.

An advantage of the processing module 30 is that primary data processing may occur close to the sensors 28 at the end effector 22. This reduces processing delays. As a result, transmission of signals to the robot controller 26 is limited to lower bandwidth processed sensor data without the need to transmit raw sensor data to the robot controller 26. The arrangement also isolates sensor related software and processing hardware in the processing module 30 without risking the robot controller 26 to additional software.

Figure 7:
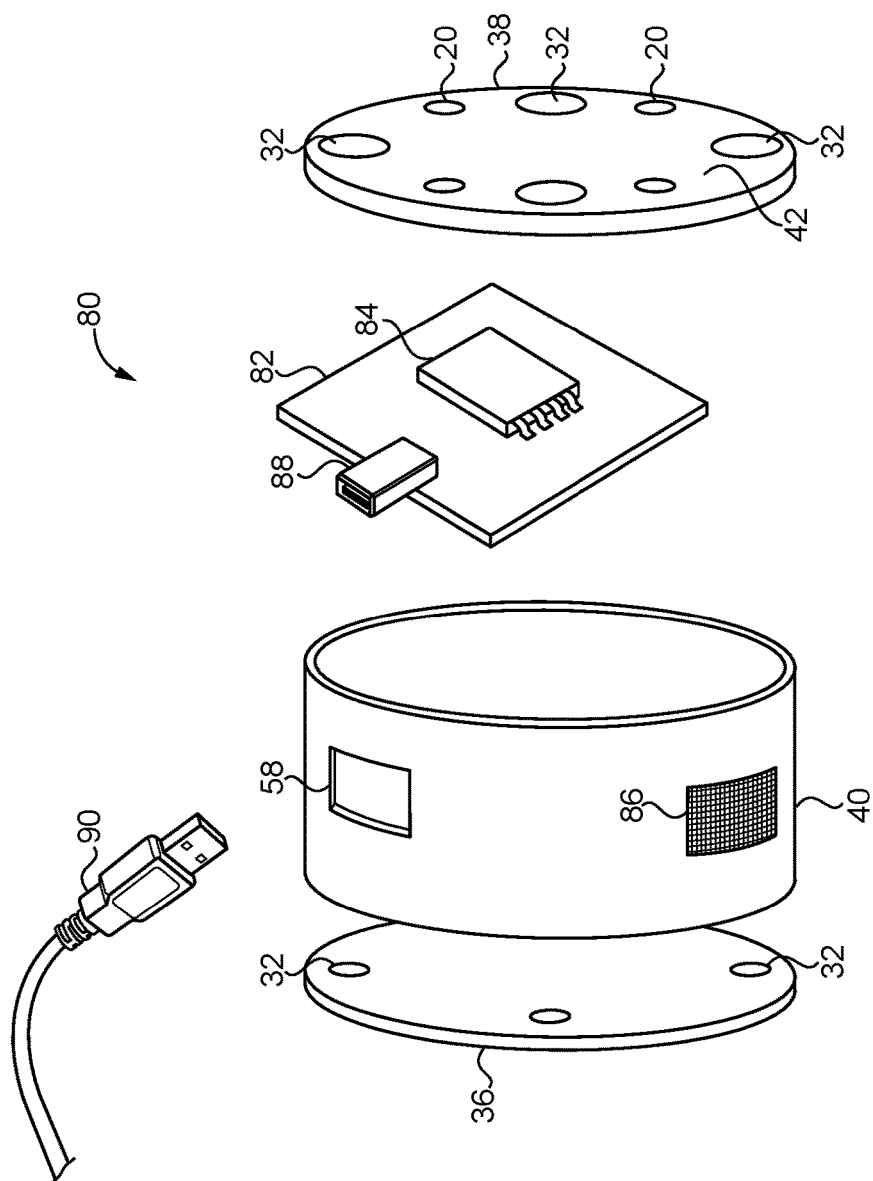
FIG. 7 is an exploded view of a sensor module.
Figure 8:
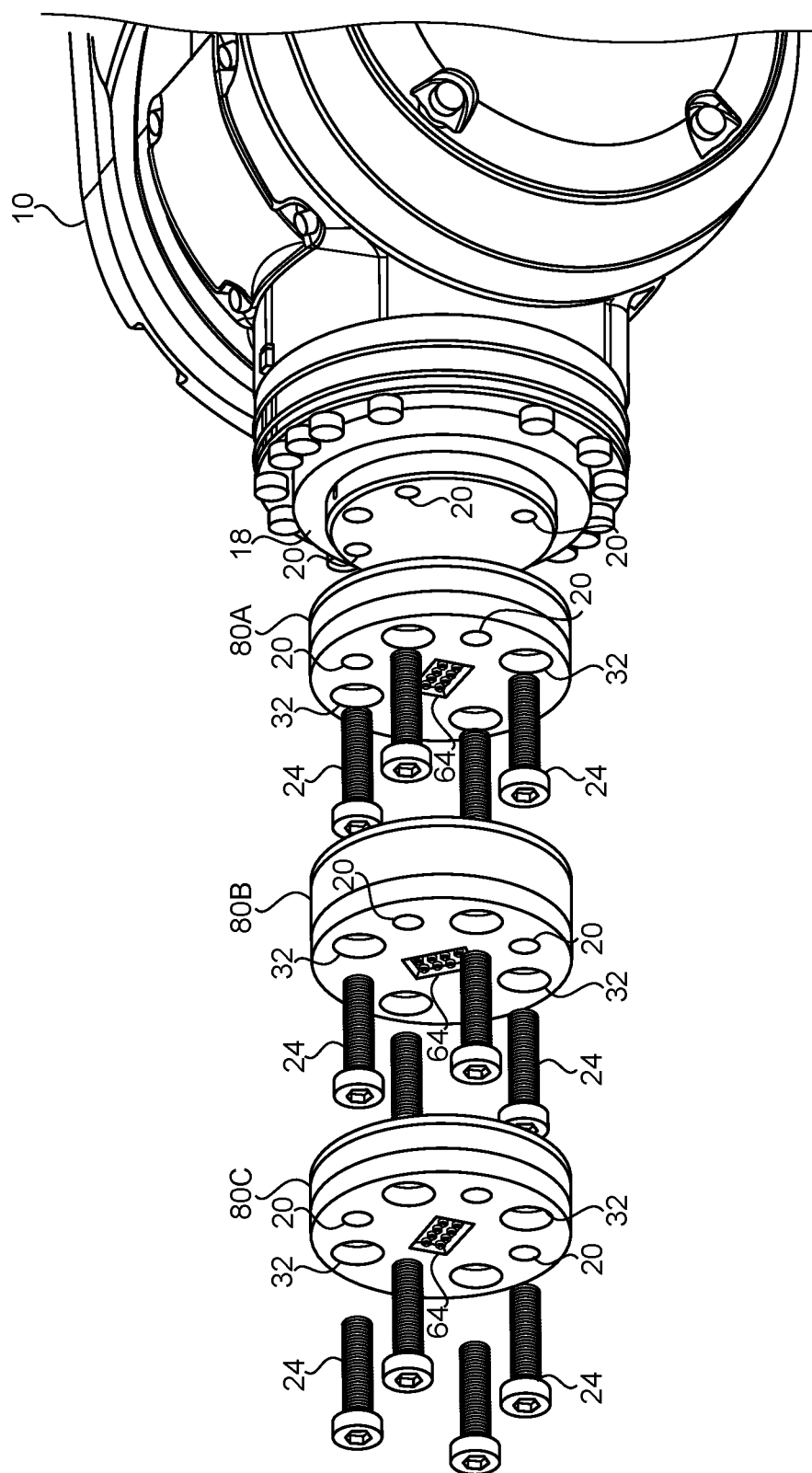
FIG. 8 is an exploded perspective view of a stack of sensor modules.

Another module 80 is shown in FIG. 7-8. This module 80 is a sensor module 80, which like the processing module 30, may be easily installed between the robot tool flange 18 and the end effector 22 in various combinations with other modules 30, 80, 100. Because the sensor module 80 shares structural similarities with the processing module 30, it is not necessary to repeat all of the detail already provided above. Like the processing module 30, the sensor module 80 has a housing 34 that can be attached on one side to a robot tool flange 18 or mounting surface 42 of another module 30, 80, 100. The end effector 22 or another module 30, 80, 100 may also be attached to the opposite side mounting surface 42 of the sensor module 80.

As shown in FIG. 7, a circuit board 82 is provided with a sensor 84 mounted thereon inside of the housing 34. The sensor 84 detects ambient condition around the sensor 84, and thus, around the sensor module 80 and near the end effector 22. A variety of sensors 84 may be used that detect various conditions including acceleration, speed, force, torque, position, magnetic field, light, temperature, pressure, humidity and sound. Unlike load cells 28A, cameras 28B and other types of sensors that may need to be located directly on the end effector 22 or in a specific place, the sensor 84 within the sensor module 80 may provide sufficient sensor data located within the module housing 34 located between the robot tool flange 18 and the end effector 22. Where the sensor 84 requires open communication with the surrounding environment (e.g., humidity, temperature, sound, etc.) it may be desirable to provide the housing 34 with an opening 86, such as a screened opening 86, to allow the surrounding atmosphere to penetrate the interior of the housing 34.

Unlike the processing module 30, the sensor module 80 may require significantly fewer input/output ports. For example, in the simplest embodiment, only a single output port 88 may be needed, such as a USB port 88, to transmit sensor data from the sensor 80. Alternatively, the sensor module 80 may transmit sensor data wirelessly, in which case the output port (e.g., wireless antenna) could be internal to the housing 34 without the need for a physical opening 58 in the housing 34 for the output port 88. The face connector 64 may also be used. Where a physical connection 88 is used for the output port 88, a cable 90 is used to connect the output port 88 to a processor 44, 26 to process sensor data from the sensor 84. For example, it may be desirable for the sensor data to be transmitted through the cable 90 (or wirelessly) to the processing module 30 described above. This allows for a short transmission distance and simplifies routing of communication cables. It may also be desirable for the output cable 90 to provide power to power the sensor 84. For example, where a USB cable 90 is connected between the output port 88 of the sensor module 80 and an input port 52 of the processing module 30, the cable 90 may provide sensor data from the sensor 84 in the sensor module 80 to the processor 44 in the processing module 80. The processing module 30 may also provide power to the sensor module 80 through the cable 90. As shown in FIG. 8, it may be possible to use a face connector 64 on the module mounting surface 42 and the opposite side surface to communicate internally without the need for external cables between modules 30, 80, 100, between modules 30, 80, 100 and the robot tool flange 18, and between the end effector 22 and a module 30, 80, 100.

FIG. 8 also shows how multiple sensor modules 80A, 80B, 80C may be stacked onto the tool flange 18 to easily add sensor functionality to the robot 10. For example, each sensor module 80 may be designed to monitor a different environmental condition. Thus, by simply selecting the desired sensor module 80 and adding it to the stack by bolting it between the robot tool flange 18 and the end effector 22, additional sensor functionality can be added. The sensor module 80 also has the advantage of overcoming the difficulty of mounting conventional sensors onto the end effector 22 (i.e., finding a suitable location and securely mounting the sensor).

It is also understood from the illustration of FIG. 8 that the various modules 30, 80, 100 described herein may also be added and ordered as desired to easily add functionality between the robot tool flange 18 and the end effector 22. For example, it may be desirable for the stack of modules 30, 80, 100 to include one or more sensor modules 80, a communications module 100 (described below), and a processing module 30. Sensor data from the sensor modules 80 may then be transmitted from the output ports 88 of the sensor modules 80 to the input ports 106 of the communications module 100. The output port 108 of the communications module 100 may be connected to the input port 52 of the processing module 30 to transmit the sensor data from the sensor modules 80. The output port 54 of the processing module 30 may then be connected to the robot controller 26 to transmit the processed sensor data, such as low data rate summaries or status indications of the sensors 84.

Figure 9:
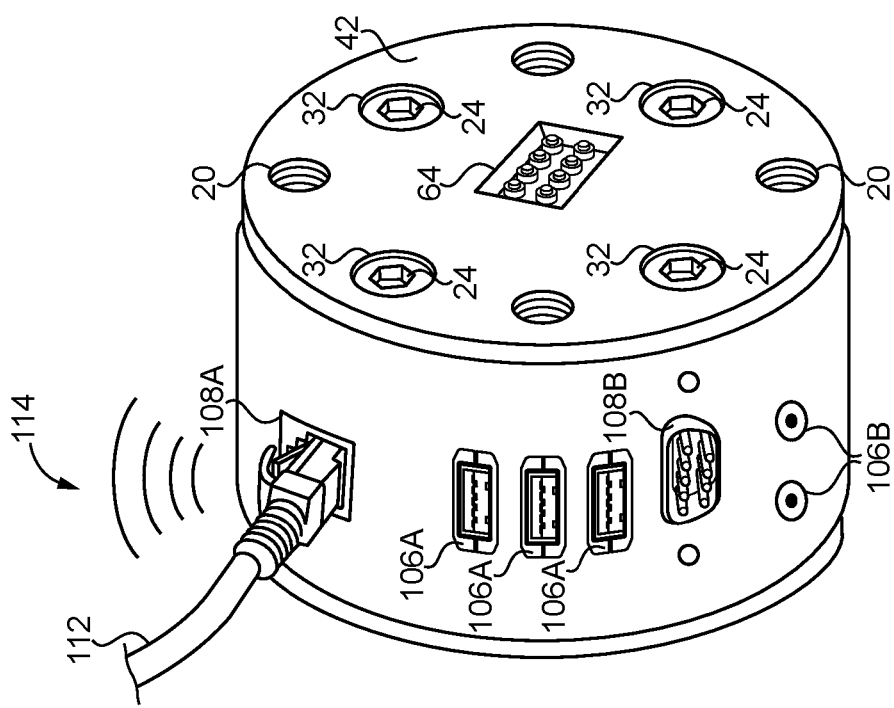
FIG. 9 is a perspective view of a communications module.
Figure 10:
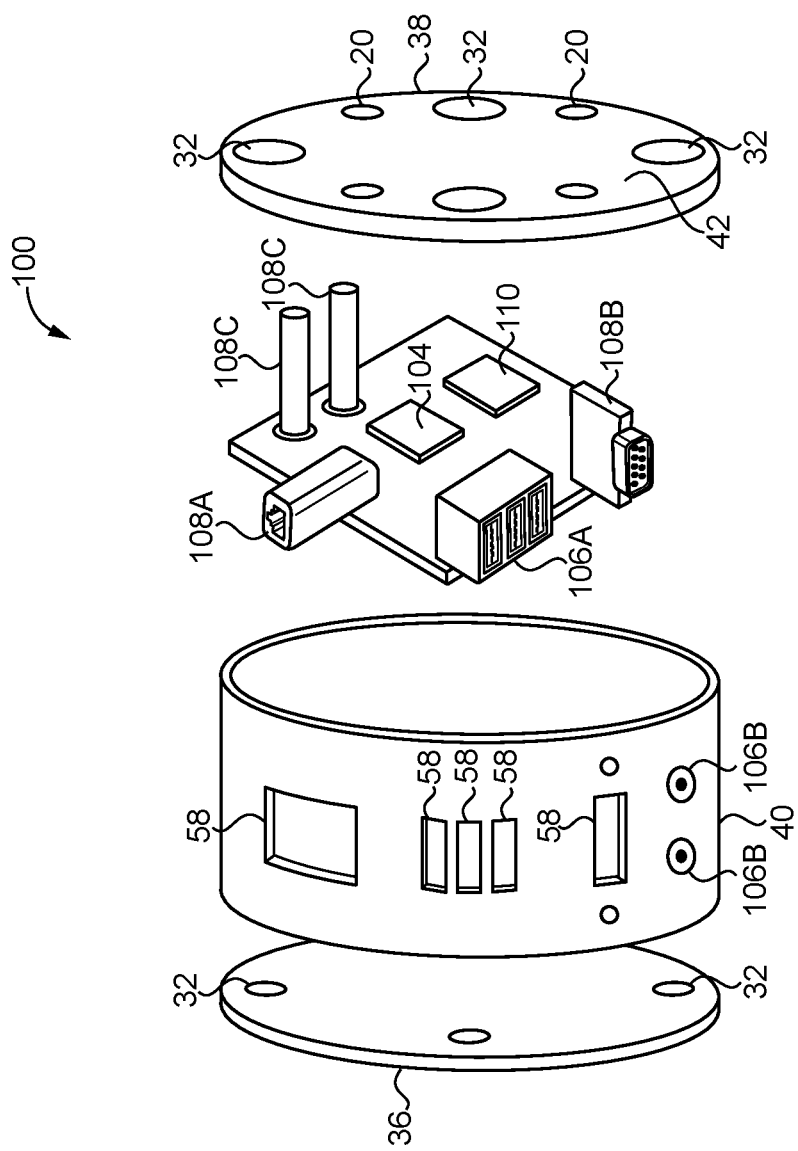
FIG. 10 is an exploded view of a communications module.

A communications module 100 which may be used with the sensor module 80 and/or the processing module 30 is shown in FIGS. 9-10. Like the processing module 30 and the sensor module 80, the communications module 100 may be easily installed between the robot tool flange 18 and the end effector 22 with or without other modules 30, 80, 100. Because of the similarities with the processing and sensor modules 30, 80, it is unnecessary to repeat all of the detailed description from above. Like the processing and sensor modules 30, 80, the communications module 100 has one mounting surface on one side that can be attached to the robot tool flange 18 or to the mounting surface 42 of another module 30, 80, 100. The opposite side is a mounting surface 42 that the end effector 22 or another module 30, 80, 100 can be attached to.

As shown in FIG. 10, a circuit board 102 is provided in the housing 34 with a data switch 104 for combining incoming sensor data from multiple input ports 106 into an output stream of data that is transmitted through a single output port 108. It is understood however that multiple, alternative input ports 106 and output ports 108 may be provided if desired. One type of input port 106 that may be desirable is a USB port 106A, and in the preferred embodiment, multiple USB ports 106A may be provided. Since USB ports 106A typically are used to transmit digital data, it may be desirable to also provide voltage input terminals 106B or the previously described face connector 64 (e.g., FIG. 9) to transmit analog data to the communications module 100.

The input ports 106 are connected to the data switch 104 on the circuit board 102. The data switch 104 combines multiple streams of data from the input ports 106 into a single stream of data that can be transmitted through a single output port 108 connected to the data switch 104. Where an analog input port 106B, 64 is provided, it is also preferable for the circuit board 102 to include an analog to digital converter 110 so that the analog data received by the communications module 100 is converted to digital data before being provided to the data switch 104. Thus, at least one of the input ports of the data switch 104 may be connected to the output port of the analog to digital converter 110. As a result, all of the data transmitted to the data switch 104 to be combined is provided as digital data even where some of the sensors connected to the communications module 100 transmit analog data.

Various types of output ports 108 may be connected to the data switch 104. For example, an RJ-45 port 108A, serial port 108B, a USB port, and/or wireless port 108C (e.g., Bluetooth and/or Wi-Fi antenna 108C) may be provided to output sensor data. It is possible for the communications module 100 to broadcast the output sensor data through each of the output ports 108. However, in such case, each output port 108 may receive the same combined data stream from the multiple input ports 106. The combined data stream supplied to the output port 108 from the data switch 104 may be connected to a robot controller 26, 44 through an output cable 112. Alternatively, a wireless output port 108C may emit a wireless signal 114 to transmit the combined output data. The robot controller 26, 44 connected to the communications module 100 may be the processing module 30 described herein or maybe the robot controller 26 that controls the joints 14 of the robot 10. It is also possible for the communications module 100 to supply power to other components through the input ports 106 or the output port 108 if desired.

The communications module 100 offers the advantage of simplifying communications routing between sensors and processing units. That is, in a conventional arrangement where multiple sensors are used on the end effector 22, an equal number of cables would be needed to connect each sensor to the robot controller 26. With a conventional robot controller 26 located near the base 12 of the robot 10, this can lead to a confusing arrangement of cables that can also create entanglement risks. By contrast, by using the communications module 100, a single output cable 112 can be used (or no cable with a wireless output port 108C). This greatly simplifies the connection between the various sensors and the robot controller 26, 44. Further, as described above, where sensor modules 80 and the processing module 30 are used, the various connections that are needed can be primarily located near the end effector 22 instead of needing to route numerous cables to the base 12 of the robot 10. In addition to simplifying the connections, response time of the end effector 22 can be reduced due to the decreased length of the communications paths.

While the above description refers principally to the communication of data from sensors to the various modules 30, 80, 100, it is understood that the processing module 30, sensor module 80 and communications module 100 could also communicate with various actuators as well. For example, the processing module 30 could output control signals to actuators in response to sensor data received through the input ports 52. The sensor module 80 and the communications module 100 could also output data to an actuator. Thus, while the modules 30, 80, 100 are principally intended to interface with data from a variety of sensors, the modules 30, 80, 100 could also be used to interface with various actuators as well.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A robot, comprising:
a base at one end of the robot;

an end effector at another end of the robot;
a joint disposed between the base and the end effector;
a robot tool mounting surface disposed between the joint and the end effector, the robot tool mounting surface comprising an industry standard tool flange, wherein the robot tool mounting surface is adapted to attach directly to the end effector so as to be in abutting contact with the end effector;
a sensor module connected directly to the industry standard tool flange, the sensor module comprising a housing with a sensor module mounting surface, the sensor module mounting surface being adapted to attach directly to the end effector; and
a sensor disposed within the housing.

2. The robot according to claim 1, wherein the housing comprises through holes for attaching the sensor module to the robot tool mounting surface with bolts extending therethrough from the sensor module mounting surface.

3. The robot according to claim 1, wherein the housing comprises first and second housing parts, the first housing part being attached to the robot tool mounting surface, and the second housing part being attached to the first housing part, the second housing part comprising the sensor module mounting surface.

4. The robot according to claim 1, wherein the industry standard tool flange is defined by ISO 9409-1:2004(E).

5. The robot according to claim 1, wherein the robot tool mounting surface comprises a plurality of first threaded holes, the sensor module being attached to the robot tool mounting surface with threaded fasteners engaging the first threaded holes.

6. The robot according to claim 1, wherein the sensor module mounting surface comprises an industry standard tool flange.

7. The robot according to claim 6, wherein the industry standard tool flange is defined by ISO 9409-1:2004(E).

8. The robot according to claim 1, wherein the sensor module mounting surface comprises a plurality of second threaded holes, the end effector being attached to the sensor module mounting surface with threaded fasteners engaging the second threaded holes.

9. The robot according to claim 1, wherein the robot tool mounting surface comprises a plurality of first threaded holes for attaching the sensor module thereto, the sensor module mounting surface comprises a plurality of second threaded holes for attaching the end effector thereto, the first and second threaded holes being defined by matching threads and hole patterns.

10. The robot according to claim 1, wherein the sensor detects an ambient condition.

11. The robot according to claim 1, wherein the sensor detects acceleration, speed, force, torque, position, magnetic field, light, temperature, pressure, humidity or sound.

12. The robot according to claim 1, wherein the housing comprises a second opening, the sensor thereby being exposed to a surrounding environmental condition through the second opening.

13. The robot according to claim 1, wherein the housing comprises a first opening for an output port, the output port being connected to the sensor and a cable being connected to the output port to communicate the sensor data to a processor.

14. The robot according to claim 13, wherein the cable further supplies power to the sensor.

15. The robot according to claim 1, further comprising a processing module disposed between the robot tool mounting surface and the end effector, the processing module comprising a housing, a processing module mounting surface, an input port and an output port, a first processor being disposed within the housing of the processing module, and the processing module mounting surface being adapted to attach the end effector thereto, wherein the input port of the processing module receives sensor data from the sensor, the first processor generates processed sensor data comprising fewer bits per second than the sensor data, and the output port of the processing module transmits the processed sensor data to a second processor of a robot controller.

16. The robot according to claim 1, wherein the sensor module mounting surface also comprises the industry standard tool flange, the robot tool mounting surface comprises a plurality of first threaded holes for attaching the sensor module thereto, the sensor module mounting surface comprises a plurality of second threaded holes for attaching the end effector thereto, the first and second threaded holes being defined by matching threads and hole patterns, the housing comprises a first opening for an output port, the output port being connected to the sensor and a cable being connected to the output port to communicate the sensor data to a processor.

17. The robot according to claim 16, wherein the sensor detects acceleration, speed, force, torque, position, magnetic field, light, temperature, pressure, humidity or sound.

18. The robot according to claim 17, wherein the housing comprises a second opening, the sensor thereby being exposed to a surrounding environmental condition through the second opening.

19. A robot, comprising:
a base at one end of the robot;
an end effector at another end of the robot;
a joint disposed between the base and the end effector;
a robot tool mounting surface disposed between the joint and the end effector, the robot tool mounting surface comprising an industry standard tool flange, wherein the robot tool mounting surface is adapted to attach directly to the end effector;
a sensor module connected directly to the industry standard tool flange, the sensor module comprising a housing with a sensor module mounting surface, the sensor module mounting surface being adapted to attach directly to the end effector; and
a sensor disposed within the housing,
wherein the robot tool mounting surface comprises a plurality of first threaded holes for attaching the sensor module thereto, the sensor module mounting surface comprising a plurality of second threaded holes for attaching the end effector thereto.

* * * * *